Feb. 10, 1942.  C. M. SUMMERS  2,272,756
REGULATING APPARATUS
Filed Nov. 1, 1940  2 Sheets-Sheet 1

Inventors:
Claude M. Summers,
by Harry E. Dunham
His Attorney.

Inventor:
Claude M. Summers,
by Harry E. Dunham
His Attorney.

Patented Feb. 10, 1942

2,272,756

UNITED STATES PATENT OFFICE 2,272,756

REGULATING APPARATUS

Claude M. Summers, Fort Wayne, Ind., assignor to General Electric Company, a corporation of New York Application November 1, 1940, Serial No. 363,909

5 Claims. (Cl. 171—242)

My invention relates to electrical regulators and more particularly to electrical regulators of the variable series impedance type for controlling the flow of current in an alternating current circuit.

It is an object of my invention to provide an improved current regulator of the above type which has no moving parts.

It is a further object of my invention to provide an improved regulator of the static type which will function automatically to maintain a desired current flow in a load device energized from an alternating current supply line with variations in both supply voltage and load impedance within predetermined limits.

It is a still further object of my invention to provide a current regulator of the static type which is simple in construction, relatively inexpensive to manufacture, and which will function to regulate current within close limits.

Further objects and advantages of my invention will become apparent as the following description proceeds and the features of novelty which characterize my invention will be pointed out with particularity in the claims annexed to and forming a part of this specification.

In accordance with the illustrated embodiment of my invention, the current supplied to an electrical load energized from an alternating current supply circuit is controlled by a variable impedance control device connected in series with the load circuit and the impedance of the control device is automatically varied to maintain within close limits a desired load current with variations in supply voltage and load impedance by means responsive to a function of the voltage drop across the control device.

Figure 1:
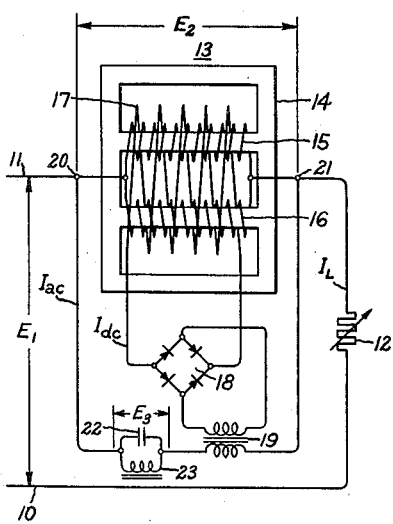
Figure 2:
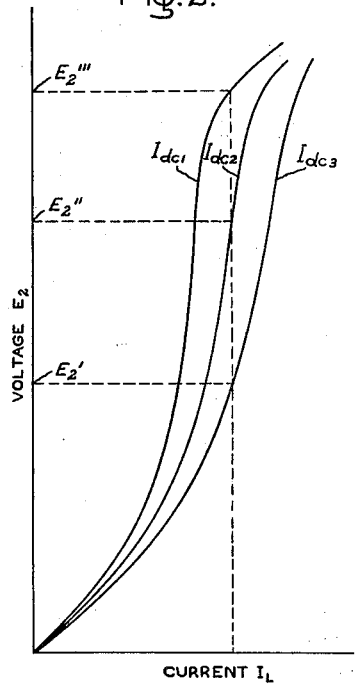
Figure 3:
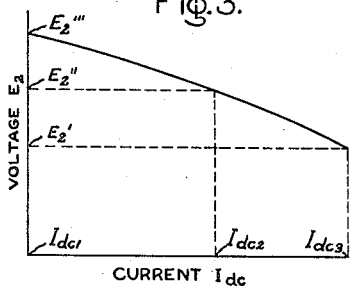
Figure 4:
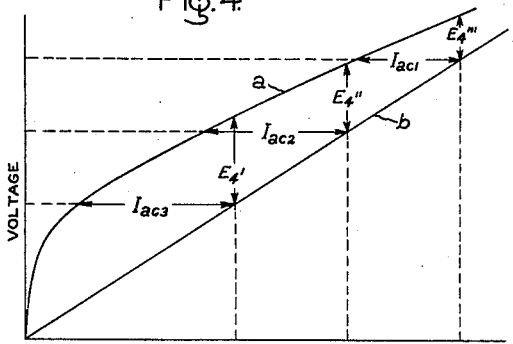

My invention will be better understood from the following description taken in connection with the accompanying drawings in which Fig. 1 illustrates diagrammatically an embodiment of the invention, Figs. 2, 3 and 4 are graphs of certain voltage-current relations existing in the circuit shown in Fig. 1 which are useful for the purpose of explaining the invention; and Figs. 5, 6, 7, 8 and 9 are modifications of the arrangement shown in Fig. 1.

Referring to Fig. 1 of the drawings, I have illustrated an alternating current supply circuit comprising the conductors 10 and 11 connected to supply current to a load 12, such as, for example, a plurality of series connected street lighting units. Connected in series with the load 12 is a control device comprising a saturable reactor 13. In this embodiment of my invention the impedance of the reactor is automatically controlled to maintain the load current $I_L$ substantially constant with variations in both the line voltage $E_1$ and the impedance of the load 12.

The saturable reactor 13 may have any one of several well known forms. In the form illustrated the reactor comprises a four-legged core 14 having two alternating current windings 15 and 16 connected in parallel and wound around the two center core legs and a saturating winding 17 wound around both of the alternating current windings. The two windings 15 and 16 are oppositely wound to prevent undesirable transformer action between these windings and the saturating winding 17. The unidirectional excitation current $I_{dc}$ for the saturating winding 17 of the reactor is obtained by means of a rectifier 18, which may be a full wave, dry disk, copper oxide type connected to be energized from the secondary winding of a transformer 19. The primary winding of the transformer 19 is connected in series with a control circuit connected to the terminals 20 and 21 of the reactor 13. The control circuit also has connected in series therewith a network comprising a condenser 22 and a saturable inductance 23, the purpose of which will be described below. The transformer 19 may be omitted but is usually desirable in order to obtain the proper voltage for the rectifier 18.

The impedance of the reactor 13 is determined by the amount of unidirectional current $I_{dc}$ flowing in the saturating winding 17. Thus if the saturating current flowing in the winding 17 increases the impedance of the reactor 13 decreases and vice versa. If the line voltage $E_1$ increases or the impedance of the load 12 decreases, or both, it is evident that the impedance of the reactor 13 will have to be increased to maintain the load current $I_L$ constant. This may be done by decreasing the saturating current $I_{dc}$ the proper amount. Conversely, if the line voltage $E_1$ should decrease or the impedance of the load 12 should increase, or both, the impedance of the reactor 13 will have to be decreased to maintain the load current $I_L$ constant. This may be done by increasing the saturating current $I_{dc}$ the proper amount. My device functions to control automatically the saturating current $I_{dc}$ and the resulting reactor impedance so that a substantially constant load current $I_L$ will be maintained under the varying conditions described above. To accomplish this I make use of the fact that any change in the value of the load current $I_L$ from the desired value will result in a change in the voltage drop across the terminals 20 and 21 of the reactor 13. This change in voltage drop is used to effect a change in the control current $I_{dc}$ and the impedance of the reactor 13.

If the load current $I_L$ increases above the desired amount, the voltage drop across reactor 13 will also increase and, as pointed out above, the impedance of reactor must be increased to bring the current $I_L$ back to normal. Since the impedance of the reactor 13 varies inversely as the control current $I_{dc}$, it is evident that under this condition the control current $I_{dc}$ will have to be decreased to bring about the desired impedance change of the reactor 13. Conversely, if the load current decreases below normal, the control current $I_{dc}$ will have to be increased. In other words, the control current $I_{dc}$ must be made to vary inversely as the voltage drop across the terminals 20, 21 of the reactor 13 in a predetermined manner.

The curves shown in Fig. 2 of the drawings illustrate how the voltage drop $E_2$ across the reactor 13 varies with the load current $I_L$. The curves $I_{dc1}$, $I_{dc2}$, and $I_{dc3}$ are for low, intermediate and high values respectively of the control current $I_{dc}$. From the curves in Fig. 2, the relationship between the voltage drop across the reactor $E_2$ and the control current $I_{dc}$ for a constant load current $I_L$ may be readily determined.

From an inspection of the curves shown in Fig. 2, it will be seen for a constant value of the load current $I_L$, the voltage drop across the reactor will change from $E_2'''$ to $E_2''$ to $E_2'$ as the control current $I_{dc}$ changes from $I_{dc1}$ to $I_{dc2}$ to $I_{dc3}$ and vice versa. This desired relation between $E_2$ and $I_{dc}$ is shown by the curve in Fig. 3 of the drawings and it may be noted that it is inverse and non-linear in character.

In order to bring about the desired inverse and non-linear relation between the control current $I_{dc}$ and the reactor voltage drop $E_2$, I utilize the control circuit connected across the terminals 20, 21 of the reactor which, as pointed out before includes the network comprising the parallel connected condenser 22 and saturable inductance 23. It will be obvious from the circuit connections that the control current $I_{dc}$ will be proportional to the current in the control circuit $I_{ac}$. The volt-ampere characteristics of the condenser 22 and the inductance 23 are designed so that the current $I_{ac}$ varies with the reactor drop $E_2$ in the manner indicated by the curve in Fig. 3 of the drawings. This may be best understood by reference to Fig. 4 of the drawings in which curve $a$ represents the volt-ampere characteristic of the inductance 23 and curve $b$ represents the volt-ampere characteristic of the condenser 22. Since the currents passing through the condenser 22 and the inductance 23 are approximately 180 degrees out of phase, the net current in the control circuit $I_{ac}$ is the algebraic difference between these currents which can be illustrated by the horizontal distances between the curves $a$ and $b$. The shapes of the curves $a$ and $b$ are such that as the voltage $E_2$, and also the voltage $E_3$ applied to the condenser 21 and reactor 23, increases the currents $I_{ac}$ and $I_{dc}$ vary in the desired manner as illustrated by the decreasing horizontal distances $I_{ac3}$, $I_{ac2}$ and $I_{ac1}$. This may be accomplished by selecting a condenser having a capacitive reactance such that the condenser curve $b$ makes an angle with the straight portion of the inductance curve $a$ so that as the voltage increases the horizontal distance between the curves decreases as indicated in Fig. 4 of the drawings.

In view of the foregoing, only a brief description of the operation of the regulating arrangement illustrated in Fig. 1 is deemed necessary. Assume that the relationship of the circuit impedances is such that normal load current $I_L$ flows in the load circuit. If the impedance of load 12 decreases or the line voltage $E_1$ rises, the load current $I_L$ will tend to increase, which causes an increase in the voltage drop $E_2$ across the reactor 13. The increase in voltage $E_2$ causes the control current $I_{dc}$ to decrease in accordance with the predetermined inverse relation between these two quantities. The decrease in control current $I_{dc}$ causes the impedance of reactor 13 to increase to a point necessary to return the load current $I_L$ to its normal value. If the impedance of the load 12 increases or the line voltage decreases, the load current $I_L$ will tend to decrease and the reverse of the above described action will take place whereby the impedance of the reactor 13 is decreased and the load current $I_L$ will return to normal value. It may also be noted that any change in the line voltage $E_1$ will cause an equal change in the reactor drop whereby the voltage applied to the load circuit will stay constant for any given load impedance. Also any change in the impedance of the load 12 will cause an equal and opposite change in the impedance of the reactor 13 whereby the total impedance of the load circuit will stay constant for any given line voltage. Thus, in cases where the impedance of the load remains constant, my apparatus may be used to maintain a constant load voltage with variations in line voltage. Also, in cases where the line voltage remains constant, my apparatus may be used to maintain constant the total impedance of the load circuit with variations in load impedance.

Figure 5:
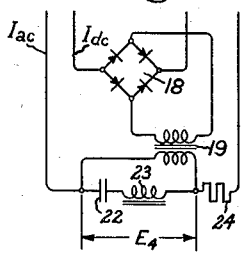

In Fig. 5 of the drawings I have shown a modification in which the condenser 22, the inductance 23, and a resistor 24 are connected in series in the control circuit and the secondary winding of the transformer 19 is energized in accordance with the voltage $E_4$. In this arrangement since the voltage drops across the condenser 22 and inductance 23 are 180 degrees out of phase, the voltage $E_4$ is the algebraic difference between these voltages which may be represented by the vertical distances between the curves $a$ and $b$ in Fig. 4. As voltage $E_2$, and also $I_{ac}$, increases, the voltage $E_4$ decreases as indicated by the decreasing vertical distances $E_4'$, $E_4''$, and $E_4'''$. Since $I_{dc}$ is proportional to $E_4$, the desired inverse and non-linear relation between $E_2$ and $I_{dc}$ may also be obtained with this arrangement.

The modifications illustrated in Figs. 6, 7, 8 and 9 of the drawings are generally similar to that illustrated in Fig. 1 and corresponding parts have been given the same reference numerals. The core structure 14 of the reactor 13 has been omitted for the sake of simplicity. In these modifications various additional arrangements are disclosed for securing the proper relation between the voltage drop across the reactor $E_2$ and the impedance of the reactor winding to maintain the desired load current $I_L$.

Figure 6:
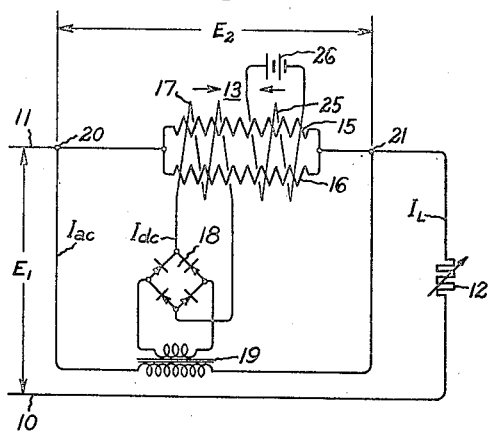

In Fig. 6 of the drawings the saturable reactor 13 is shown as being provided with an additional saturating winding 25 energized from a source of constant unidirectional potential such as a battery 26. The ampere turns of the winding 25 are such that the winding will always produce a magnetic flux which is greater in magnitude and opposite in direction to that produced by the control winding 17 within limits of the regulator operation. The primary winding of the transformer 19 is connected directly across the terminals of the reactor 20 and 21 so that the current $I_{ac}$ and also the current $I_{dc}$ in the winding 17 is proportional to the voltage drop $E_2$. Since the magnetic flux produced by the winding 17 which is proportional to $I_{dc}$ is in opposition to that produced by the winding 25 and since the flux produced by the winding 25 is greater than that produced by the winding 17 under any condition of operation, it is clear that the net flux in the reactor core which controls the impedance of the windings 15 and 16 will vary inversely as the control current $I_{dc}$. Thus as the voltage $E_2$ and the current $I_{dc}$ increase, the saturation of the reactor core decreases and the impedance of the reactor increases in a predetermined manner. By properly proportioning the circuit constants the relationship between the voltage $E_2$ and the impedance of the reactor 13 can be made approximately the same as in the arrangement illustrated in Fig. 1 whereby the desired operating characteristic is obtained. In other words, the circuit constants are chosen such that when the voltage $E_2$ changes due to a change in the voltage $E_1$ or a change in the impedance of the load 12 the energization of the saturating winding 17 and consequently the impedance of the reactor 13 changes sufficiently and in a proper direction to maintain the load current $I_L$ substantially constant. This may be accomplished, for example, by selecting the proper relative ampere turns of the windings 17 and 25.

Figure 7:
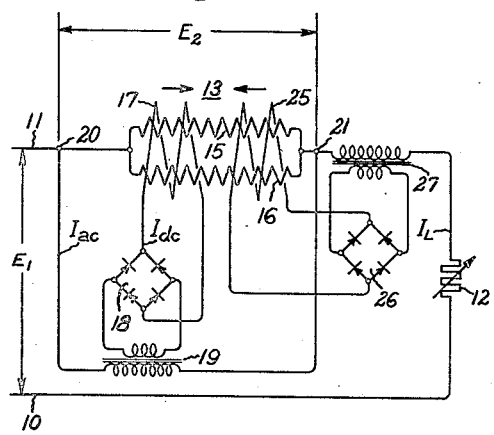
Figure 8:
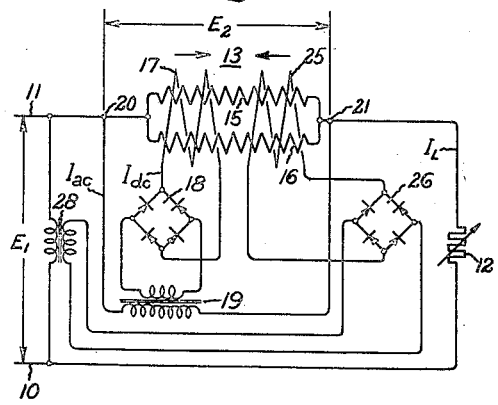
Figure 9:
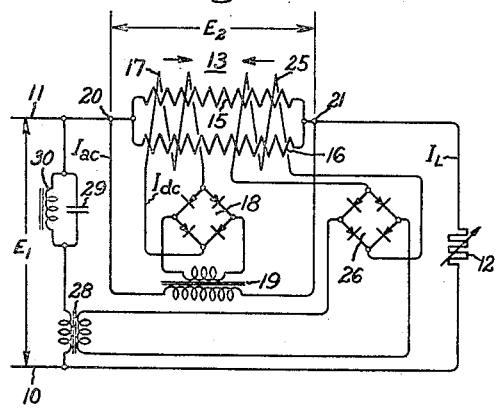

The arrangements illustrated in Figs. 7, 8 and 9 of the drawings differ only from the arrangement in Fig. 6 in that other means are provided for securing a source of constant unidirectional potential to supply the reactor winding 25.

In the Fig. 7 arrangement, the winding 25 is supplied with unidirectional current from a rectifier 26 which is energized from the secondary winding of a current transformer 27 having its primary winding connected in series with the load circuit. Since the load current $I_L$ is maintained constant, it is obvious that the voltage supplied to the winding 25 will also remain constant.

In cases where the line voltage $E_1$ remains substantially constant the rectifier 26 may be energized from the secondary of a transformer 28 having its primary connected directly across the conductors 10, 11. This arrangement is illustrated in Fig. 8.

In the arrangement illustrated in Fig. 9, the current in the primary winding of the transformer 28 and consequently the current supplied to the winding 25 is maintained constant by connecting in series therewith a constant current device comprising a parallel connected condenser 29 and saturable inductance 30. The constant current property of the parallel connected condenser 29 and saturable inductance 30 is obtained by designing these elements so that their volt-ampere curves are parallel in the operating range of the device in a manner which is well known in the art.

In all of the regulating arrangements described above the variable impedance or saturable reactor connected in series with the load circuit has been illustrated and described as controlled in accordance with the voltage drop thereacross. It will be understood that this voltage drop is the same as the voltage difference between the line voltage and the voltage across the load and therefore these two quantities are equivalents for control purposes. It will also be understood that any voltage proportional to the voltage drop across the control impedance may be used to effect the desired control such as the voltage drop across a part of the control impedance.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a saturable core device having an alternating current winding and a saturating winding, said alternating current winding being connected in series with said circuit, means for supplying said saturating winding with a unidirectional current, the relation between the value of said unidirectional current and the voltage drop across said alternating current winding necessary to maintain constant current in said circuit under different operating conditions having a predetermined characteristic, and means responsive to said voltage drop for varying said unidirectional current in accordance with said characteristic, said means including a condenser and a saturable inductance.

2. In combination, an alternating current circuit, a saturable core device having an alternating current winding and a saturating winding, said alternating current winding being connected in series with said circuit, a control circuit connected across said alternating current winding, said control circuit including a condenser and a saturable inductance, the volt-ampere characteristics of said condenser and inductance being such that an electrical condition of said control circuit varies inversely as the voltage across said alternating current winding, means for supplying a unidirectional current to said saturating winding, and means for varying said unidirectional current in accordance with the said electrical condition of said control circuit.

3. In combination, an alternating current circuit, a saturable core device having an alternating current winding and a saturating winding, said alternating current winding being connected in series with said circuit, a control circuit connected across said alternating current winding, said control circuit including a parallel connected condenser and saturable inductance, the volt-ampere characteristics of said condenser and inductance being such that the current in said control circuit varies inversely as the voltage across said alternating current winding, means for supplying a unidirectional current to said saturating winding, and means for varying said unidirectional current in accordance with the current in said control circuit.

4. In combination, an alternating current circuit, a saturable core device having an alternating current winding and a saturating winding, said alternating current winding being connected in series with said circuit, a control circuit connected across said alternating current winding, said control circuit including a resistor, a condenser and a saturable inductance connected in series, the volt-ampere characteristics of said condenser and inductance being such that the voltage across the series connected condenser and inductance varies inversely as the voltage across said alternating current winding, means for supplying a unidirectional current to said saturating winding and means for varying said unidirectional current in accordance with the voltage across said series connected condenser and inductance.

5. In combination, an alternating current circuit, a saturable core device having an alternating current winding and two saturating windings, said saturating windings being arranged to produce opposing magnetic fluxes and said alternating current winding being connected in series with said circuit, means responsive to the voltage drop across said alternating current winding for supplying a unidirectional control current to one of said saturating windings, means for supplying the other of said saturating windings with a substantially constant unidirectional current of sufficient magnitude to produce a magnetic flux greater than that produced by the first mentioned saturating winding.

CLAUDE M. SUMMERS.